Figure 1:
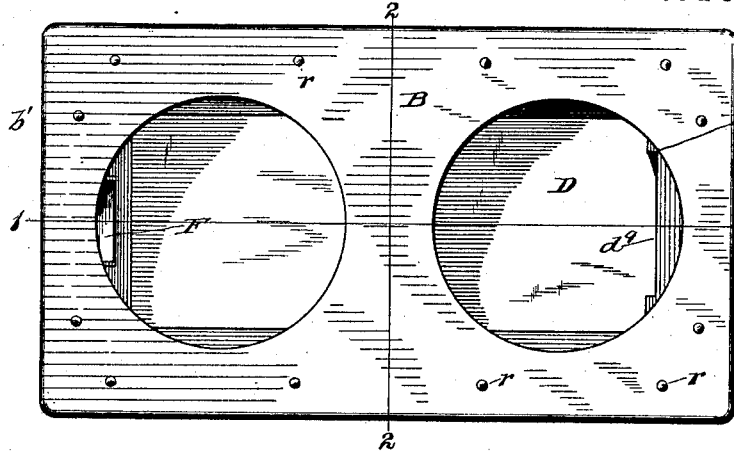

(No Model.) 3 Sheets—Sheet 1.

W. H. H. KNIGHT.
PORTABLE FURNACE.

No. 320,799. Patented June 23, 1885.

Attest:
A. M. Proctor
F. H. Knight

Inventor:
W. H. H. Knight (No Model.)
W. H. H. KNIGHT.
PORTABLE FURNACE.
No. 320,799.  Patented June 23, 1885.
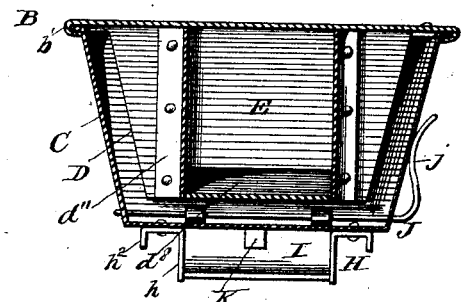
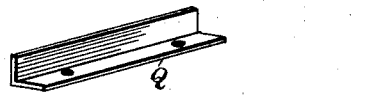
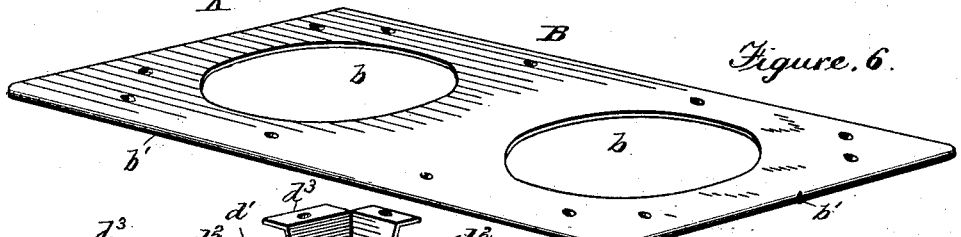
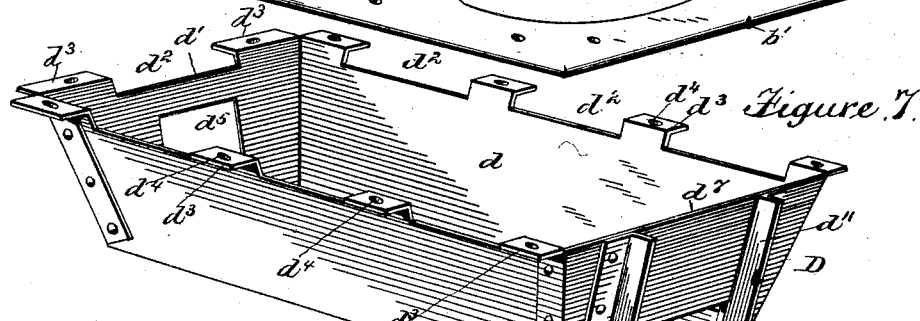
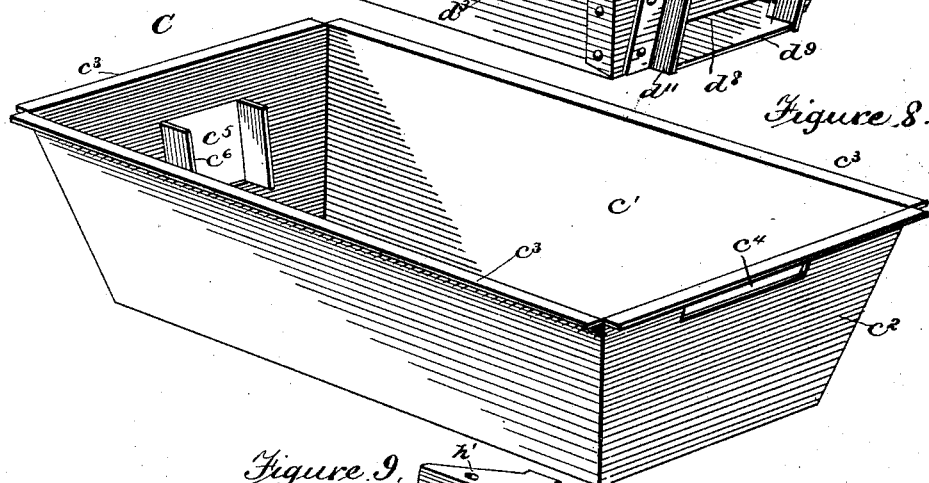
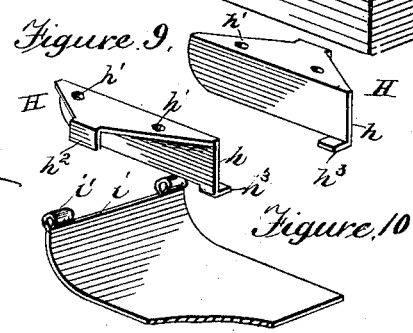
Attest:
A. M. Proctor
F. H. Knight
Inventor:
W. H. H. Knight (No Model.)

W. H. H. KNIGHT.
PORTABLE FURNACE.

No. 320,799.

3 Sheets—Sheet 3.

Patented June 23, 1885.

Attest:
A. M. Proctor
F. H. Knight

Inventor:
W. H. H. Knight

UNITED STATES PATENT OFFICE.

WILLIAM H. H. KNIGHT, OF WASHINGTON, DISTRICT OF COLUMBIA.

PORTABLE FURNACE.

SPECIFICATION forming part of Letters Patent No. 320,799, dated June 23, 1885.

Application filed March 25, 1885. (No model.)

*To all whom it may concern:*

Be it known that I, WILLIAM H. H. KNIGHT, a citizen of the United States, residing at Washington, District of Columbia, have invented certain new and useful Improvements in Portable Furnaces or Summer Stoves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to cooking-stoves of that class known to the art as "portable furnaces," and has for its object the provision of an article of the class named especially adapted for use during the summer months, or at times when it is desirable to employ a small quick fire for cooking or other purposes, and equally desirable that the temperature of the room may be maintained at the lowest possible point.

The invention contemplates, particularly, the provision of a portable furnace wherein the greatest possible amount of heat may be obtained from a comparatively small quantity of fuel; such result due to the fact that the products of combustion are caused to come into full contact with the bottoms of vessels upon the furnace before passing from the combustion-chamber to the smoke-exit, and also to the fact that the heat contained in the products of combustion when leaving the combustion-chamber is, in a great measure, eliminated therefrom before reaching the smoke-exit, such heat returning into the combustion-chamber or into contact with the vessels upon the furnace.

The invention further contemplates the provision of means whereby constant drafts of air may be maintained from the smoke-exit by currents of air passing through the stationary stove or furnace upon which said portable furnace rests, and the provision of means for regulating such draft.

The invention further contemplates the provision of air-inlet ports for the combustion-chamber, such ports having such construction that, while capable of supplying to the fuel the necessary amount of air to said chamber, they are yet so arranged that air cannot pass in right lines to said chamber, whereby all danger from counter drafts and the objectionable features incident thereto is avoided.

The invention further contemplates the provision of a portable furnace having a portion of its top adapted to be utilized as a warming-shelf, while the body proper thereof is being used for cooking or for other purposes.

To the accomplishment of the above-named ends the invention consists in the construction, arrangement, and combination of parts, substantially as hereinafter described, and specifically pointed out in the claims.

Figure 2:
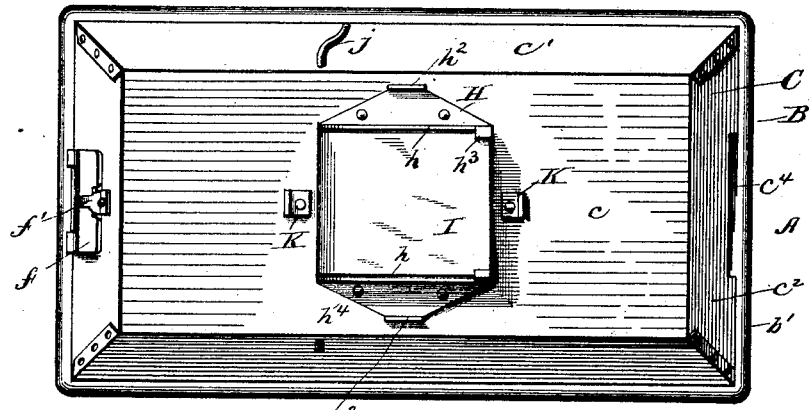
Figure 3:
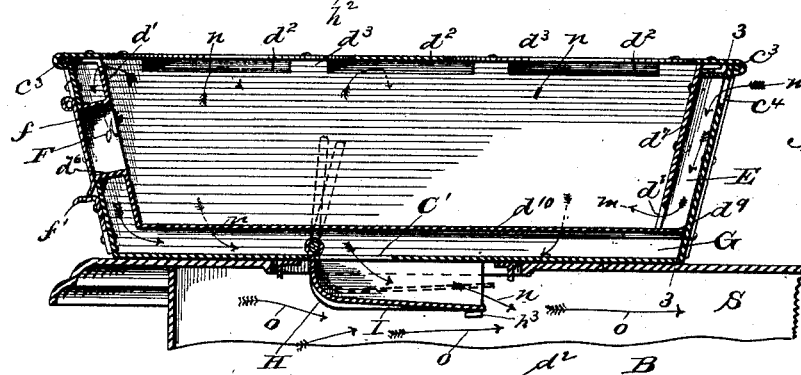
Figure 4:
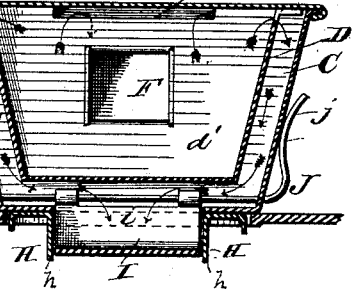
Figure 12:
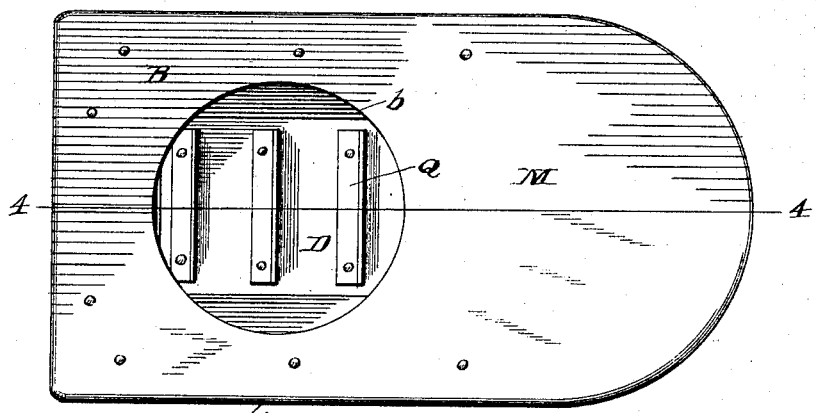
Figure 13:
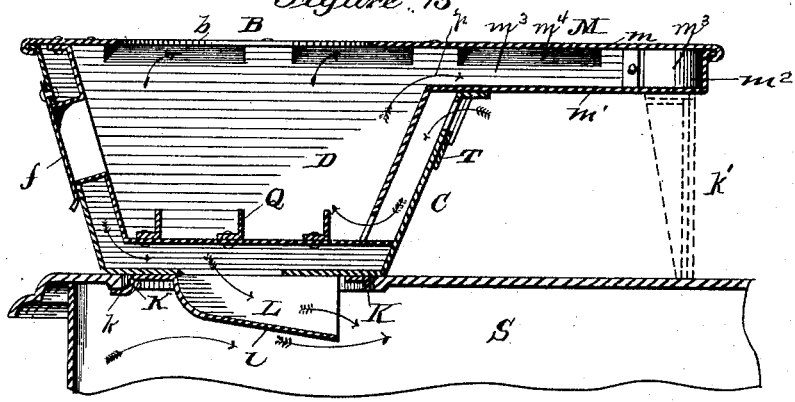

In the drawings, Figure 1 is a top plan view of a portable furnace constructed in accordance with my invention. Fig. 2 is a bottom plan view thereof. Fig. 3 is a longitudinal vertical section taken through the furnace on the line 1 1 of Fig. 1. Fig. 4 is a transverse vertical section thereof on the line 2 2 of Fig. 1. Fig. 5 is a similar transverse section on the line 3 3 of Fig. 3, to show the arrangement of air-inlet flues. Figs. 6 to 10, inclusive, are detail perspective views of the various parts comprising the furnace, taken from top to bottom in the order in which they are arranged in said furnace. Fig. 11 is a detail perspective view of one of the fuel-supporting bars of the combustion-chamber. Fig. 12 represents a top plan view of my improvement, provided with a projecting warming-shelf. Fig. 13 is a longitudinal section thereof on the line 4 4 of Fig. 12.

Referring to the drawings, in which similar letters of reference denote similar parts, A designates the furnace, consisting in the following-described elements, viz:

B designates the furnace-top, preferably made of sheet metal, and having one or more openings, $b$, for the reception of cooking-utensils. The edges of the top are turned down to form a flange, $b'$, to secure said top to the body of the furnace. I do not limit myself to this described construction, inasmuch as any desired means may be employed to accomplish this purpose.

C designates a shell or exterior wall of the furnace, preferably made of sheet metal in the form shown, to wit: having a bottom, $c$, and outwardly-flaring sides and ends $c'$ $c^2$.

The shell C is provided at its top edges with a projecting flange, $c^3$, that engages the flange $b'$ of the top B.

$c^4$ designates an opening, preferably rectangular, formed through one end of the shell near its top edge. The opposite end of the shell C is provided at or near its middle with a square opening, $c^5$, having flanges $c^6$ at each side thereof, said flanges $c^6$ formed by bending the parts cut from the opening $c^5$ backward, as will be readily understood.

C' designates an opening formed through the bottom of the shell. The purpose of the openings C' $c^4$ $c^5$ will be presently described.

D designates the interior shell or combustion-chamber of the furnace, preferably formed of sheet metal in shape similar to the shell C. The side walls, $d$, and end walls, $d'$, are provided with cut-away portions $d^2$, and upwardly and laterally projecting ears or lugs $d^3$, having perforations $d^4$ to receive rivets $r$, for the purpose of securing the chamber D to the top B. The end $d'$ of the shell D is provided with an opening, $d^5$, the upper and lower edges of which have flanges $d^6$, projecting outwardly and formed in manner similar to the flanges $c^6$ of the shell C. The opposite end, $d^7$, of the shell D is provided near its bottom with an opening, $d^8$, preferably rectangular in shape, having a flange, $d^9$, projecting outward in the plane of the bottom $d^{10}$ of the shell.

$d^{11}$ designates strips of sheet metal secured to the end $d^7$, and extending from top to bottom thereof in parallel planes, at a distance from each other equal to the length of the opening $d^8$.

The above-described parts of the furnace A are secured together in the following manner, viz: The combustion-chamber D is first secured to the top B. The exterior shell, C, is now placed in position upon and secured to said top. When thus secured together, it will be observed that the flanges $d^9$ and $d^{11}$ of the shell D extend to and bear against the interior surface of the shell C, and that the upper and lower ends of the passage E thus formed register with the openings $c^4$ $d^8$ of the shells C and D, respectively. The purpose of said passage is to admit air to the combustion-chamber, as indicated by the arrows $m$. It will also be observed that the flanges $c^6$ $d^6$ of the shells C and D, respectively, operate to form sides for an entrance or doorway, F, for the admission of fuel to the combustion-chamber. The doorway F is closed by a hinged flap, $f$, having a suitable lock or catch, $f'$.

G designates an air-space extending at the sides, ends, and bottom of the combustion-chamber, excepting only the door F and air-duct E, between said combustion-chamber and its inclosing-shell C.

By reference to Figs. 3 and 4 it will be seen that the products of combustion indicated by the arrows $n$ pass from the combustion-chamber through the openings $d^2$ at the top thereof into the air-space G, and thence pass downward and are drawn from the smoke-exit C' into the stationary stove S below.

It will be understood that the air-space G not only operates to prevent radiation of heat from the combustion-chamber into the room, but also to cause the heat contained in the products of combustion to be eliminated therefrom, and to return into the combustion-chamber, thus utilizing to the fullest extent the heat generated within the chamber D.

H designates short strips of sheet metal having downwardly-projecting flanges $h$, apertures $h'$, and downwardly-projecting ears or lugs, $h^2$. The flanges $h$ are provided at their lower forward ends with laterally-projecting ears $h^3$. The strips H are secured to the bottom of the shell C at each side of the opening C' therein.

I designates a flap having one of its ends, $i$, turned upward and provided at each side with sockets $i'$. The end $i$ is hinged within one end of the opening C' by a rod, J, that extends through the sides of the shell C near the bottom thereof, and also through the sockets $i'$ of the flap I. One end, $j$, of the rod J is turned upward and bears against the exterior of the shell C, operating as a handle to set the flap I at any desired angle.

By reference to Figs. 3 and 4 it will be observed that the flap I is interposed between the downward-extending flanges $h$ of the strips H, and that said flap, in connection with said strips H, operates to form a smoke-exit flue adapted to extend downward into the stationary stove or furnace S, thereby insuring a perfect draft of air from the air-flue E through the combustion-chamber D to the smoke-exit, such draft being caused by drafts of air, (indicated by the arrows $o$, Fig. 3,) through the stove S. The downward movement of the flap I is limited by the stops $h^3$ of the strips H, as shown.

It will be observed that the flap I operates as a damper to control the draft that it may be set and maintained at any desired angle between the flanges $h$ by its handle $j$.

K designates lugs or ears secured to the bottom of the shell C at each end of the flap I. These lugs, in connection with the lugs $h^2$ of the strips H, operate to prevent the furnace A from moving longitudinally or laterally upon a stove, said lugs $h^2$ and K extending downward into the openings in the top of the stove.

By the within-described construction of the furnace A the products of combustion are compelled to come into full contact, first, with the top B and the vessels on the opening $b$ thereof; thence to pass through the openings $d^2$ to the air-space G; thence to pass to and from the smoke-exit C' to the stove S below.

I attach importance to the construction of smoke-exit, shown and described herein, and to the principle involved, viz: forming said smoke-exit in the shape of a box or flue extending downward to enter the body of a stove, whereby a constant draft is insured in the furnace.

In Fig. 13 I have shown the furnace provided with a smoke-exit, L, similar in external appearance to that shown in Figs. 3 and 4, and herein described, but having a fixed bottom, $l$, instead of a movable flap I. It will be understood that any degree of inclination may be imparted to the bottom of the smoke-flue without sacrificing the principle upon which said smoke-exit operates, as hereinbefore described.

Figs. 12 and 13 show my improved furnace provided with an extension, M, at its top, said extension consisting of a top, $m$, bottom $m'$, sides $m^2$, and hot-air space $m^3$, communicating directly with the combustion-chamber, and forming a warming-shelf whereon articles may be made hot without interfering in any way with the body of the furnace.

When the furnace is provided with the extension M, it is necessary to provide means to keep said furnace in a horizontal position. To accomplish such purpose I preferably form one of the stops K with a hooked lower end, $k$, that takes under the lower edge of the stove-opening, through which the flue L projects, and operates to keep the furnace level. A leg, shown by dotted lines $k'$, may be employed.

It will be observed that the products of combustion, indicated by the arrows $p$ in Fig. 13, pass into the body of the extension M and are discharged therefrom through the opening $m^4$.

In Figs. 12 and 13 I have shown the combustion-chamber provided at its bottom with angular strips Q, of sheet metal, said strips operating as a grate to keep fuel from contact with the bottom, so that air may freely circulate below such fuel. In lieu of said strips a perforate plate may be placed within the combustion-chamber at any desired distance from the bottom thereof.

The several figures above described have the same generic principles described herein, differing only in minor details of construction.

I am aware that portable furnaces or summer stoves consisting of a combustion-chamber provided with direct air-inlet and smoke-exit, have been made and used; but I am not aware that a furnace similar in form and operation to that herein shown and described has ever been constructed prior to my invention thereof.

It is not necessary that my improvement have the precise external form herein shown, as any desired configuration may be given thereto, providing the essential elements, to wit: exterior shell, interior shell, air-space, and flues have proper relation each with the other.

In Fig. 13 I have shown at T a sliding door, in connection with the air-inlet opening $c^4$, its purpose being to regulate the quantity of air passing to the chamber D.

Having thus fully described my invention, what I claim as new, and desire to secure by Letters Patent, is—

1. As a new article of manufacture, a portable furnace or summer stove consisting of the following-named elements, to wit: an inclosing shell or case having parallel sides and ends, a top having apertures to receive cooking utensils, an interior shell or combustion-chamber depending from said top, air-flues communicating with said combustion-chamber, and a smoke-exit situated at the middle of the bottom of the inclosing-shell, substantially as and for the purpose described.

2. In a portable furnace or summer stove, an inclosing shell or case having parallel sides and ends, a top having apertures to receive cooking utensils, an interior shell or combustion-chamber depending from said top within and at a distance from the exterior shell, and provided with openings in its side walls near the top of the same, partitions between the exterior and interior shells, forming a flue, openings connecting said flue and openings through the exterior shell connecting with said flue, and a smoke-exit situated at the middle of the bottom of the inclosing-shell, substantially as described.

3. In a portable furnace or summer stove, a top provided with one or more openings to receive cooking utensils, and an interior shell or combustion-chamber secured thereto and depending therefrom, said chamber provided near its bottom with an air-inlet and at its top with one or more openings for the passage of smoke, &c., in combination with an exterior shell secured to said top and surrounding the combustion-chamber at a distance therefrom, and a projecting smoke-flue secured to the middle of the bottom of said exterior shell, substantially as described.

4. In a portable furnace or summer stove, and in combination with the exterior shell or walls thereof, a projecting smoke-flue having a movable and adjustable side, substantially as described.

5. In a portable furnace or summer stove, an air-flue, E, consisting in the openings $c^4$ in the exterior shell, and $d^8$ in the combustion-chamber, and connecting-passage E, arranged substantially as described, in combination with the exterior shell, C, combustion-chamber D, depending from the top, top B, and a smoke-exit, as and for the purpose set forth.

6. In a portable furnace, the combination of a projecting smoke-flue at the middle of the furnace-bottom, substantially as described, with the exterior shell, C, combustion-chamber D, depending from the furnace-top, openings $d^2$, and air-inlet E, having openings $c^4$ $d^8$, as and for the purpose set forth.

7. In a portable furnace or summer stove, the combination of the interior shell or combustion-chamber D, depending from its top, said chamber having air-inlet E and smoke-passages $d^2$, and surrounded by an exterior shell, C, with said exterior shell, C, provided at its bottom with an opening, C', projecting angle-strips H, and interposed flap I, substantially as described.

8. In a portable furnace or summer stove, the combination of a top, B, having openings $b$, combustion-chamber D, and exterior shell, C, with a door, F, air-inlet E, openings $d^2$, and smoke-exit having flap or damper I, substantially as described.

9. In a portable furnace or summer stove, the combination of the interior shell or combustion-chamber, D, exterior shell, C, air-inlet E, openings $d^2$, air-space G, openings C', and projecting flanges $h$, with the flap or damper I and rod J, having upwardly-turned portion $j$, whereby to hold said flap in any desired position, substantially as described.

10. In a portable furnace or summer stove, projecting ears or lugs K, in combination with the exterior shell, C, of said furnace, and a downwardly-projecting smoke-exit secured thereto, substantially as described.

11. In a portable furnace or summer stove, the combination of the internal shell or combustion-chamber D, having an opening, $d^3$, at its bottom, openings $d^2$ at its top, and a door, with an exterior shell, C, having openings $c^4$ at its top, opening C' at its bottom, top B, having openings $b$, and an air-space, G, between the shells D and C, substantially as and for the purpose described.

In testimony whereof I affix my signature in presence of two witnesses.

WILLIAM H. H. KNIGHT.

Witnesses:
H. T. BERNHARD,
JOS. FORREST.